United States Patent [19]
Brinton et al.

[11] Patent Number: 5,466,423
[45] Date of Patent: Nov. 14, 1995

[54] APPARATUS FOR CORONA DISCHARGE TREATMENT OF AN ARTICLE

[75] Inventors: David L. Brinton, Neward; George K. Kodokian, Wilmington, both of Del.

[73] Assignee: E. I. Du Pont de Nemours and Company, Wilmington, Del.

[21] Appl. No.: 170,968

[22] Filed: Dec. 21, 1993

[51] Int. Cl.$^6$ .................................................. B01J 19/08
[52] U.S. Cl. ...................................... 422/186.05; 422/907
[58] Field of Search .............................. 422/186.05, 907, 422/186.21, 186.23, 186.26; 204/157.15, 164; 250/324, 325; 264/22; 361/225, 233; 34/245, 250, 255

[56] References Cited

U.S. PATENT DOCUMENTS

| | | | |
|---|---|---|---|
| 3,385,966 | 5/1968 | Rosenthal | 250/49.5 |
| 3,405,052 | 10/1968 | Schirmer | 204/312 |
| 3,419,489 | 12/1968 | Delaney, Jr. | 204/312 |
| 3,435,190 | 3/1969 | Schirmer | 219/384 |
| 3,483,374 | 12/1969 | Erben | 250/49.5 |
| 3,760,153 | 9/1973 | Davies et al. | 219/384 |
| 3,777,164 | 12/1973 | Osman | 250/531 |
| 3,973,132 | 8/1976 | Prinz et al. | 250/531 |
| 4,273,635 | 6/1981 | Beraud et al. | 204/165 |
| 4,392,178 | 7/1983 | Radice | 361/233 |
| 4,603,032 | 7/1986 | Kroos | 422/186.21 |
| 5,038,036 | 8/1991 | Kouguchi et al. | 250/324 |

FOREIGN PATENT DOCUMENTS 790038   7/1968   Canada.

*Primary Examiner*—Donald P. Walsh
*Assistant Examiner*—Daniel Jenkins

[57] ABSTRACT

An apparatus for corona discharge treatment of an article, and in particular an article comprising a conductive composite, includes a first electrode, which is a rotating, high-frequency voltage electrode and a second electrode, which is preferably a translation table, disposed with respect to the high-frequency voltage electrode so as to provide a return path to ground. The translation table supports the article to be treated, and oscillates with respect to the first electrode. Since translation table supports the article to be treated, the article itself is grounded, which is important when treating conductive composite articles. An adjustment mechanism provides a constant gap between the high-frequency voltage electrode and the article, so that the voltage does not seek the article. This enhances the efficiency of the corona treatment of the article. The first electrode rotates continuously and independently of the motion of the article in order to dissipate heat from the high-frequency voltage electrode. This arrangement makes the apparatus particularly useful for treating articles comprising conductive fibers, since such articles have relatively high power requirements.

9 Claims, 1 Drawing Sheet

APPARATUS FOR CORONA DISCHARGE TREATMENT OF AN ARTICLE

BACKGROUND OF THE INVENTION

1. Field of the Invention

The present invention relates to an apparatus for corona discharge treatment of an article. In particular, the invention relates to an apparatus for corona discharge treatment of a surface of an article comprising a conductive composite in order to enhance the surface adhesion of the article.

2. Description of the Related Art

Corona discharge treatment of surfaces of articles made of thermoplastic polymers is a well-known technique to enhance the surface adhesion of such articles. A number of applications and modifications to corona discharge technology for treating fiber composites based upon thermoplastic polymeric matrices are described in the literature. See, for example, Kodokian et al., "Surface pretreatment and adhesion of thermoplastic fibre-composites", *Journal of Materials Science Letters* 7 (1988) 625–627, which discloses treating thermoplastic-composite substrates placed on an automatically controlled table which travels horizontally backwards and forwards under a high-frequency voltage, discharge electrode.

Corona discharge devices for treating sheets of material generally comprise a pair of electrodes, at least one of which rotates. For example, U.S. Pat. No. 3,973,132 to Prinz discloses a corona discharge apparatus for treating non-conductive foils comprising a rotating electrode pair, the high-frequency voltage electrode having a profiled cross section, and the ground electrode being a smooth cylinder. When high voltage is applied to one of the electrodes, a corona discharge takes place through the air gap between the electrodes and onto the surfaces of the foil. U.S. Pat. No. 4,273,635 to Beraud et al. discloses a process for corona treatment of bulky fibrous webs derived at least partially from thermoplastic fibers to impart cohesion to the webs. The process includes passing the webs between a pair of rotating cylindrical metallic electrodes. U.S. Pat. No. 4,392,178 to Radice discloses an apparatus for enhancing the piezoelectric properties of polymeric films by corona treatment using a roller electrode mounted for movement along the circumference of a motorized, rotating drum which propels the film. The roller electrode moves in an oscillatory motion normal to the axis of rotation of the drum. U.S. Pat. No. 3,435,190 to Schirmer discloses a corona discharge apparatus used to perforate films of dielectric material. The apparatus includes a stationary, blade-like electrode covered with electrically insulating materials along its length and another elongated, rotatable electrode, between which a sheet of the dielectric material passes. Canadian Patent No. 790,038 to Adams discloses an apparatus for corona treatment of plastic films which conveys a sheet of such plastic film on a cylindrical, rotating roller which acts as one electrode, and passes close to a similarly contoured stationary electrode covered with a layer of dielectric material. The apparatus also has a locknut for adjusting electrode spacing.

In order to obtain uniform corona treatment of an article, surface sparking must be evenly distributed, or the voltage applied by the electrodes will be concentrated in one area and fail to uniformly treat the surface. Achieving uniform corona discharge across the high-frequency voltage electrode requires exacting spacing tolerances, not only between the two electrodes, but in the article-electrode gap as well. Through continued use, gap tolerances are often exceeded, and the discharge uniformity along the high-frequency voltage electrode is destroyed, as evidenced by sparking and pitting of the high-frequency voltage electrode surface. Moreover, most corona discharge devices are not able to maintain even gap spacing when there are thickness variations in the article.

A problem especially arises in the corona treatment of composite articles comprising conductive fibers. In this situation, conventional devices and methods will not be effective, due to increased sparking caused by loose or exposed conductive fibers in the composite. To treat conductive composite articles, high power must be supplied to the high-frequency voltage electrode, since the voltage will seek the conductive fibers in the composite article. This lessens the efficiency of the corona treatment of the surface of the article. Since high power must be supplied, overheating of the electrode, as well as the articles to be treated, becomes a serious obstacle. If the problem is not addressed, the surface of the article may be destroyed by overheating and ablating before the desired surface corona treatment is achieved. Alternately, the increased incidence of sparking can render the corona treatment ineffective. Additionally, at high power levels, any non-uniformity in the electrode is magnified, which further increases the chances that sparking will occur.

SUMMARY OF THE INVENTION

The present invention solves the problems associated with the prior art by providing an apparatus for corona discharge treatment of an article comprising a conductive composite which is able to maintain uniform corona discharge along the high-frequency voltage electrode by providing a constant spacing between the high-frequency voltage electrode and the article.

The apparatus of the present invention also reduces the incidence of sparking and thus provides more effective corona discharge treatment and less chance of non-uniformity in the electrode than devices of the prior art.

Also, the apparatus of the present invention is able to supply high-frequency voltage to the discharge electrode without overheating the electrode, thereby reducing the possibility of degradation of the electrode. This prevention of overheating the electrode also decreases the occurrence of non-uniformity of the electrode and consequent sparking.

To achieve the foregoing solutions and in accordance with the purpose of the invention, as embodied and broadly described herein, the invention comprises an apparatus for corona discharge treatment of a surface of an article. The apparatus comprises a first electrode for supplying a high-frequency voltage to the article; a second electrode for providing a return path to ground; and means for adjusting the spacing between the first electrode and the article in order to provide a constant gap therebetween.

Further in accordance with the present invention, there is provided an apparatus for corona discharge treatment of a surface of an article, comprising: a high-frequency voltage electrode rotatable about a shaft disposed along the central axis of the cylindrical electrode for applying a high-frequency voltage to the article; a timing belt drive system for rotating the rotatable electrode; a translation table for holding the article, the translation table being disposed with respect to the high-frequency voltage electrode so that as the voltage is supplied to the article, the translation table provides a return path to ground; and a rider wheel connected to the shaft of the rotatable electrode for adjusting the spacing between the high-frequency voltage electrode and the article in order to provide a constant gap therebetween.

DETAILED DESCRIPTION OF THE PREFERRED EMBODIMENT

Figure 1:
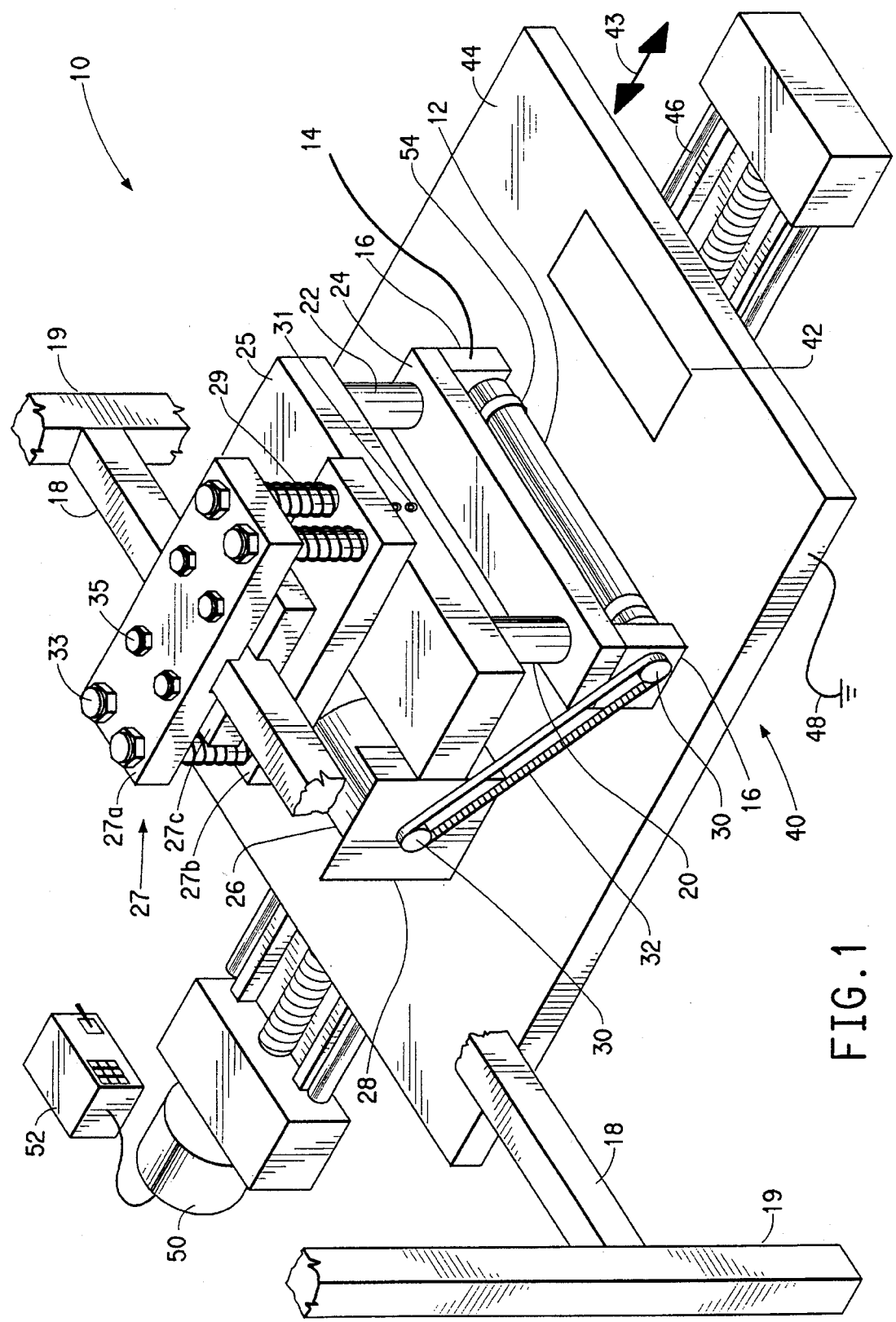
FIG. 1 is a perspective view of an apparatus for corona discharge treatment of an article according to the present invention.

Reference will now be made in detail to the present preferred embodiment of the invention, an example of which is illustrated in the accompanying drawing.

In accordance with the invention, there is provided an apparatus for corona discharge treatment of a surface of an article. The apparatus of the present invention is shown generally at 10 in FIG. 1. The apparatus of the present invention is particularly suited for treating articles made of conductive composites, such as thermoplastic composite articles used for adhesive bonding. As noted above, since the voltage will seek the conductive fibers in the composite article, relatively high power must be supplied to the high-frequency voltage electrode. As used herein, the term "high power" means up to 24 kV. In addition, when treating conductive composites, loose or exposed conductive fibers in the composite material increase the incidence of sparking. The apparatus of the present invention is capable of treating such conductive composite articles by virtue of its elements and configuration as will be described below.

As embodied herein, the apparatus of the present invention comprises a first, rotating electrode for applying a high-frequency voltage to a surface of the article. A first electrode is shown as a cylinder 12 as shown in FIG. 1. The first electrode may take any form, such as a blade, as long as it is capable of being supplied with high voltage. High voltage is supplied through a cable 14 as shown in FIG. 1 and is applied to first electrode 12 via a brush contact (not shown). First electrode 12 is supported by a pair of insulating spacer blocks 16 as shown in FIG. 1. Blocks 16 are connected to a cylinder mounting apparatus which comprises a support beam 18, a pair of polymeric insulators 20 and 22, a bar 24, a bar 25 having a plurality of screws 31 and a pivoting assembly, shown generally at 27. Support beam 18 supports spacer blocks 16, insulators 20 and 22, bars 24 and 25, pivoting assembly 27 and first electrode 12. Support beam 18 is connected to a pair of vertical supports 19, which provide support for beam and thus all the elements the beam supports. Bar 24 supports spacer blocks 16. In addition, bar 24 acts as an insulator and a support for the first electrode. Insulators 20 and 22 are preferably polymeric and keep the high-frequency voltage from jumping from first electrode 12 to support beam 18. Insulators 20 and 22 support bar 24, blocks 16 and first electrode 12. Bar 25 supports insulators 20, 22, spacer blocks 16 and electrode 12. Pivoting assembly 27 comprises an upper block 27a and a lower block 27b and a plurality of springs 29 disposed therebetween. Pivoting assembly is provided with a plurality of screws 33 and 35. Pivoting assembly 27 also comprises a middle block 27c, which supports the pivoting assembly with respect to the support beam by virtue of screws 35. Screws 33 adjust the tension of springs 29 and thus the distance between upper block 27a and lower block 27b. The apparatus of the present invention is adjustable according to the surface contour and the position of the article being treated. Specifically, pivoting assembly 27 allows for vertical motion of bars 24 and 25, insulators 20 and 22, spacer blocks 16 and electrode 12, should the article be curved or have varying elevations. Screws 31 of bar 25 allow electrode 12, spacer blocks 16, insulators 20 and 22 and bars 24 and 25 to tilt, should the article be disposed in a position other than generally parallel to the closest side of electrode 12 as shown in FIG. 1.

First electrode 12 is preferably made of aluminum, though other conductive materials are suitable. The first electrode is preferably covered with a dielectric material, which changes the difference in the dielectric constant of the first electrode and the article. The dielectric material is preferably silicone rubber. However, any material having a dielectric constant of about 3.75 to about 3.95 (at 25° C. and a frequency ranging from $1\times10^3$ to $1\times10^8$) would be suitable for use with the present invention.

The apparatus of the present invention further comprises a timing belt drive system for rotating the first electrode. It should be understood that it is within the scope of the invention to use any electrical, mechanical or electro-mechanical system to rotate the first electrode. As shown in FIG. 1, timing belt drive system comprises a motor 26 for driving the belt drive system. Motor 26 is preferably an AC motor. A stepper motor is not preferred, since interference cause by corona discharge is likely with such a motor. A suitable AC motor for driving the timing belt drive system is Type KC1-24A2 #749NG7055, made by Bodine Electric Co., of Chicago, Ill. This motor is 115 V continuous duty, 1 phase, 60 Hz, 100 ma, 40 RPM, 1.2 V μfarad capacitor, 44 oz./in. torque, can be powered from a variable AC source, and is reversible. Belt drive system also comprises a motor bracket 28 which supports motor 26 and a pulley assembly including a pulley 30, an optional guard bracket (not shown) which protects the operator from pinch points, or rotating hazards, an insulated timing belt 32 supported by pulley 30, which drives the first electrode and an optional guard covering (not shown) which also protects the operator from pinch points. The timing belt drive system also acts as an insulator for the first electrode.

The apparatus of the present invention also comprises a second electrode for providing a return path to ground as the high-frequency voltage is supplied to the first electrode and is subsequently applied to the article. In a preferred embodiment, the second electrode comprises a translation table, shown generally at 40 in FIG. 1, which holds an article 42. Translation table 40 also imparts oscillatory motion to the article. This oscillatory motion can be in the horizontal planar direction as shown by arrow 43 in FIG. 1, the vertical planar direction, or a planar direction which is oblique with respect to either the horizontal or the vertical planar directions, just as long as an air gap can be maintained between the first, high-frequency voltage electrode and the second electrode, or ground. The translation table may also be referred to as an X-Y table, and can be purchased commercially, for example, from Daedal, of Harrison City, Pa. As shown in FIG. 1, translation table 40 includes a platform 44 which supports the article to be treated. Translation table 40 also includes a track 46 for horizontal oscillation of the table, a ground wire 48 for grounding the table and a stepper motor 50, including a controller 52, which imparts oscillatory motion to the table.

In operation, high-frequency voltage is applied to the first electrode, and the stepper motor is turned on. Platform 44 makes multiple passes beneath, or next to, the first electrode, depending on how the table is disposed with respect to the first electrode, to achieve the desired amount of corona discharge treatment. The oscillation of the table ensures uniform treatment across the article, since, for each oscillation, the article passes fully under the first electrode, and all the surface area of the article is equally treated. Since the surface at any particular point is not subjected to continuous corona treatment, it has time to cool during each oscillation. This is especially important when treating conductive articles, since they are more susceptible to sparking and overheating. Since the table supports the article to be treated, the article itself is also grounded, which is important when treating conductive composite articles.

With the present invention, the first electrode rotates independently of the velocity of the second electrode and consequently, the article held thereon. This independent rotation allows high power to be supplied thereto without overheating the high-frequency voltage electrode. As noted above, high power, which causes the electrode to overheat, is necessary for treating articles comprising conductive composites as compared to treating articles made of other materials. For example, an article which comprises polyethylene requires only about 0.2–0.5 J/mm.$^2$ of energy per surface area. In contrast, the apparatus of the present invention allows 20 J/mm.$^2$ of energy per unit area to be supplied to the surface of a composite known as AS-4 PEEK, where AS-4 is a type of carbon fiber and PEEK is a poly ether ether ketone, commercially available from ICI of Wilmington, Del. Preventing overheating of the high-frequency voltage electrode extends the life of the dielectric material covering and hence extends the life of the electrode. In addition, sparking effects are distributed evenly over the surface of the first electrode, with the result that (1) degradation of the silicone rubber cover from thermal and UV effects is mitigated; and (2) pin-hole breakthroughs from the cover to the first electrode are prevented, thus also extending the life of both the cover and the electrode.

In accordance with the present invention, the apparatus of the present invention further includes adjusting means for adjusting the spacing between the article and the first electrode in order to provide a constant gap therebetween. In a preferred embodiment, the adjusting means comprises a rider wheel 54, which is connected to the shaft of rotating first electrode 12. Since rider wheel 54 is connected to the shaft of the rotating first electrode, it rotates with the first electrode. The rider wheel has a diameter which is slightly greater than the diameter of the first electrode, depending on how much air gap is desired. This causes a constant gap to be maintained between the first electrode and the article. Since the rider wheel has a larger diameter than the first electrode, if the rider wheel were metallic, this configuration would cause the wheel to short to ground. Therefore, it is preferable that the rider wheel is made of a non-conductive material. This keeps the voltage from the high-frequency voltage electrode from shorting to ground.

In operation, as the first electrode rotates, rider wheel 54 rides along the article and provides a constant gap between the first electrode and the article at every point on the article. This constant gap enables uniform application of corona discharge, since the voltage does not seek the article in concentrated areas. The rider wheel is especially useful when the article's surface is curved and/or has varying elevations. It should be noted that it is within the scope of the present invention that the rider wheel can move independently of the first electrode, as long as a constant air gap is maintained.

It should be noted that the gap between the first electrode and the article must be properly chosen. If this gap is too large or too small, sparking can also occur, since the preferred path for the voltage will again be to ground. Hence, the article will not be effectively treated under such circumstances. The proper gap between the first electrode and the article is determined based on the type of material to be treated, the thickness of the article, as well as the relationship between the gap between the first electrode and the article, and the gap between the first and second electrodes. Moreover, the relationship between the gap between the first electrode and the article and the gap between the first electrode and the second electrode is important to avoid sparking. If these gaps are comparable, there will be a higher incidence of sparking, since the corona discharge voltage will go to ground (the second electrode), rather than to the surface of the article.

It will be apparent to those skilled in the art that various modifications and variations can be made in the arrangement of the rider wheel of the present invention without departing from the scope or spirit of the invention. For instance, the rider wheel can be located at either or both ends of the first electrode. The rider wheel could even be located at the center of the first electrode, along the longitudinal length thereof if a split electrode is employed as the first electrode.

Alternatively, the means for adjusting the spacing between the first electrode and the article may comprise a robot for controlling the position of the first electrode. In addition, a laser sensor could be used to determine the geometry of the article, and the robot could be used to adjust the position of the article, as well as to control the position of the first electrode.

Other embodiments of the invention will be apparent to those skilled in the art from consideration of the specification and practice of the invention disclosed herein. It is intended that the specification be considered as exemplary only, with a true scope and spirit of the invention being indicated by the following claims.

What is claimed is:

1. An apparatus for corona discharge treatment of an article, comprising:

(a) a first, rotating electrode for supplying a high-frequency voltage to the article;

(b) a second electrode for providing a return path to ground; and (c) means for adjusting the spacing between the first electrode and the article in response to varying elevations in the surface of the article, thereby providing a constant gap therebetween.

2. The apparatus of claim 1, wherein the first electrode comprises a rotating cylinder rotatable about a shaft disposed along the central axis of the cylinder.

3. The apparatus of claim 2, wherein the adjusting means comprises a rider wheel connected to the shaft of the cylinder and rotatable therewith.

4. The apparatus of claim 3, wherein the diameter of the rider wheel is greater than the diameter of the cylinder.

5. The apparatus of claim 1, wherein the second electrode comprises a translation table for holding the article and for oscillating the article with respect to the first electrode.

6. The apparatus of claim 5, wherein the second electrode further comprises a stepper motor for imparting oscillatory motion to the translation table.

7. The apparatus of claim 1, further including a pivoting assembly disposed above the first electrode for allowing vertical motion of the first electrode.

8. The apparatus of claim 1, further including a bar disposed above the first electrode, the bar having a plurality of screws disposed therein for allowing the first electrode to tilt.

9. An apparatus for corona discharge treatment of an article, comprising:
- (a) a cylindrical electrode rotatable about a shaft disposed along the central axis thereof for applying a high-frequency voltage to the article;
- (b) a timing belt drive system for rotating the cylindrical electrode;
- (c) a translation table for holding the article, the translation table being disposed with respect to the cylindrical electrode so that as the voltage is supplied to the article, the translation table provides a return path to ground; and
- (d) a rider wheel connected to the shaft of the rotatable cylindrical electrode for adjusting the spacing between the cylindrical electrode and the article held on the translation table, thereby providing a constant gap therebetween.

* * * * *